United States Patent [19]

Kato et al.

[11] Patent Number: 4,477,628

[45] Date of Patent: * Oct. 16, 1984

[54] COMPOSITION WITH IMPROVED POT LIFE

[75] Inventors: Yasushi Kato; Hisao Furukawa, both of Kobe, Japan

[73] Assignee: Kanegafuchi Kagaku Kogyo Kabushiki Kaisha, Osaka, Japan

[*] Notice: The portion of the term of this patent subsequent to Feb. 1, 2000 has been disclaimed.

[21] Appl. No.: 405,334

[22] Filed: Aug. 5, 1982

Related U.S. Application Data

[63] Continuation-in-part of Ser. No. 306,829, Oct. 3, 1981, abandoned.

[30] Foreign Application Priority Data

Oct. 3, 1980 [JP] Japan ............................ 55-139086

[51] Int. Cl.$^3$ .............................................. C08F 8/00
[52] U.S. Cl. .................................. 525/100; 525/103; 526/279

[58] Field of Search ................ 525/100, 103; 526/279

[56] References Cited

U.S. PATENT DOCUMENTS

| | | | |
|---|---|---|---|
| 4,043,953 | 8/1977 | Chang et al. | 525/100 |
| 4,161,572 | 7/1979 | Yonezawa et al. | 525/100 |
| 4,181,687 | 1/1980 | Ward et al. | 525/101 |
| 4,191,713 | 3/1980 | Yonezawa et al. | 525/38 |
| 4,191,714 | 3/1980 | Yonezawa et al. | 525/102 |
| 4,310,640 | 1/1982 | Kato et al. | 525/328 |
| 4,371,664 | 2/1983 | Kato et al. | 525/100 |

*Primary Examiner*—Melvyn I. Marquis
*Attorney, Agent, or Firm*—Moonray Kojima

[57] ABSTRACT

A composition consisting essentially of a homogeneous mixture of 0.01 to 10 parts by weight of a novel hardening catalyst and 100 parts by weight of a vinyl type resin containing at least one silyl radical, wherein the pot life of the vinyl type resin, when exposed to ambient atmosphere, is substantially improved. The composition is useful as a paint, coating, sealant or the like.

6 Claims, No Drawings

COMPOSITION WITH IMPROVED POT LIFE

BACKGROUND OF THE INVENTION.

This is a Continuation In Part of same 306,829 filed Oct. 3, 1981, now abandoned.

FIELD OF THE INVENTION

This invention relates to a composition consisting essentially of a homogeneous mixture of a vinyl type resin containing at least one hydrolytic silyl radical at end groups or in side chains of each molecule, and a hardening catalyst. More specifically, this invention relates to such a composition which has a substantially improved pot life while being exposed to the ambient atmosphere.

DESCRIPTION OF THE PRIOR ART

The present inventors have disclosed in Japanese Pat. (OPI) No. 36395/1979, a vinyl type resin containing silyl radicals at end groups or in side chains of each molecule. Such resins have excellent luster, weathering resistance, and discoloring resistance. Also, these resins have a capacity for forming a finely cross-linked network structure in the presence of even a trace of moisture in the ambient atmosphere, and thus becoming resistant to solvents, water, heat, scratching, and weathering while enhancing adhesion to inorganic matters, due to the hydrolytic silyl radicals contained therein.

It was noted, however, that although such a vinyl resin with hydrolytic silyl radicals hardened with the aid of hardening catalysts, there also exists a deficiency in that the pot life under exposure to air is too short, particularly when the silyl radicals had three hydrolytic radicals.

A number of ways have been suggested for improving such a short pot life. For example, in U.S. Pat. No. 4,043,953, pot life is improved by adding 0.5 to 15% by weight hydrolytic reactive silanes represented by the formula $X_nSi(OR)_{4-n}$, wherein X represents an organic radical having 1 to 12 carbon atoms, R represents methyl, ethyl, 2-methoxymethyl, 2-ethoxyethyl, an alkyl radical having 5 or less carbon atoms, n is an integer from 0 to 2 inclusive; to organic silanepolymers produced by subjecting a certain kind of monomer to copolymerization with an acrylate alkoxysilane, methacrylate alkoxysilane, or vinylalkoxysilane based upon the weight of the organic silane polymer, wherein the monomer does not contain active hydrogens like those in hydroxyl, carboxylic and amido radicals, but in the radical $CH_2=C<$.

The U.S. Pat. No. 4,043,953 proposes using 0.1 to 5% by weight, preferably 0.2 to 1% by weight of organic acids, such as p-toluene sulfonic acids, and n-butylphosphoric acid; metal salts of organic acids, such as tin naphthenate, dibutyltin dilaurate, iron stearate, and lead octenate; organic amines, such as isoborondiamine, methylenediamine, and imidazol, as hardening catalysts in the copolymerization. However, no disclosure is contained in the patent concerning pot life of the vinyl resin under exposure to the air. Pot life is an important consideration for the resin. The measurement result of pot life in a closed (not ambient) atmosphere is shown in an example with reference to a mixture of organic silane polymer, hydrolytic silane, and hardening catalysts.

In measuring pot life, the U.S. Pat. No. 4,043,953 discloses in different examples that only the use of organic amines gives a satisfactory result, and that use of other compounds does not give satisfactory pot life. Nevertheless, when organic amines are used as a hardening agent for vinyl type polymers, disadvantageously, they tend to stain the polymer. Therefore, finding other hardening catalysts has been a major endeavor for workers in the art.

SUMMARY OF THE INVENTION

Accordingly, an object of the invention is to overcome the aforementioned and other deficiencies, disadvantages and defects of the prior art.

Another object is to improve the pot life of a vinyl type resin, without reducing their other disadvantageous properties.

The foregoing and other objects are attained by the present inventor's discovery that the pot life of a vinyl type resin having at least one silyl radical, can be substantially and unexpectedly improved by combining in a homogeneous mixture, 100 weight parts of such vinyl type resin and 0.01 to 10 weight parts of a novel kind of hardening catalyst as set forth hereinbelow, in greater detail. The hardening catalyst may be one or more of the following: (1) a mercaptide or sulfide type organic tin compound which has either a Sn—S or Sn=S bond; (2) organic carboxylic acids or acid anhydrides; and (3) carboxylic acid type organic tin compounds used together with (1) or (2). Advantageously, the combining of the hardening catalyst and vinyl type resin, by synergistic action, substantially and unexpectedly improves the pot life of the resin when such resin is exposed to ambient atmosphere, without substantially reducing any of the other advantageous properties of the resin used alone.

DETAILED DESCRIPTION OF THE PREFERRED EMBODIMENTS

The vinyl type resin used in this invention preferably contains at least one, and more preferably more than one, silyl radicals that are coupled with a hydrolytic radical. The silyl radicals are represented by the general formula:

wherein X represents a hydrolytic radical, $R_1$ and $R_2$ represent hydrogen atom, alkyl, aryl, or aralkyl radicals any of which has 1 to 10 carbon atoms, and n is an integer of from 1 to 3, inclusive. The hydrolytic radical can be for example halogen, alkoxy, acyloxy, ketoximato, amino, acid amide, aminoxy, mercapto, and alkenyloxy radicals.

The vinyl type resin of this invention which contains such silyl radicals can be produced in various ways. However, there are two industrially advantageous manners which are preferred: (A) hydrosilylation between a vinyl resin having a carbon double bond which vinyl resin was priorly produced by copolymerization of one or more vinyl compounds in the manner to be discussed, and a hydrosilane; and (B) copolymerization of a vinyl compound and a silyl compound which has double bonds capable of polymerization. These two methods are discussed in detail below. As used herein, the term "carbon double bond" means carbon carbon double bond.

The first method (A) involves producing a vinyl type resin which can be used in this invention by reacting a hydrosilane with a vinyl resin having carbon double bonds in the presence of a catalyst selected from transition elements in Group VIII. The vinyl resin having the carbon double bond is priorly produced by copolymerization of the vinyl compound hereinafter listed with allyl acrylate, allyl methacrylate or diallyl acrylate, such as hereinafter explained. The hydrosilane used in this invention has the formula:

$$\underset{X_n-Si-H}{\overset{(R_1)_{3-n}}{|}} \quad (II)$$

wherein $R_1$ represents a monovalent hydrocarbon radical selected from alkyl, aryl, and aralkyl radicals, X represents a hydrolytic radical, and n is an integer from 1 to 3 inclusive. The hydrosilane can be illustrated, for example, by halogenosilanes, such as methyldichlorosilane, trichlorosilane, and phenyldichlorosilane; alkoxysilanes, such as methyldiethoxysilane, methyldimethoxysilane, phenyldimethoxysilane, trimethoxysilane, and triethoxysilane; acyloxysilanes, such as methyldiacetoxysilane, phenyldiacetoxysilane, and triacetoxysilane; aminoxysilanes; such as methyldiaminoxysilane, triaminoxysilane, methyldiaminosilane, triaminosilane, bis-(dimethylketoxymate)methylsilane, bis-(cyclohexylketoxymate)methylsilane, methyldiisopropenoxysilane, and triisopropenoxysilane.

The amount of these hydrosilanes to be used, is arbitrarily decided with reference to the number of carbon double bonds contained in the vinyl resin. However, it is preferred to use an amount in the range of from 0.5 to 2 times the number of the carbon double bonds in molarity. As a matter of course, using more of the silane is possible. In such a case, however, extra silane is collected as it is unreacted.

In addition, the present invention makes it possible to employ inexpensive and reactive halogenosilanes as a starting material. The vinyl resin having silyl radicals, which is produced by using halogenosilanes, rapidly hardens at room temperatures when exposed to ambient atmosphere, while releasing hydrogen halides. Thus, this sort of vinyl type resin has a smell of hydrogen chloride, for example, and tends to attack most things near to or touching it. This fact, in effect, confines it to a narrow use. Accordingly, the halogen radicals in the vinyl type resin are desirable to be replaced by some other hydrolytic functional radicals. Thus, method A, vinyl compounds containing hydroxyl radicals are not preferred for use in the invention.

The halogen radicals may be substituted by alkoxy, acyloxy, acynoxy, amino, acid amide, ketoximato, or mercapto radical according to a process disclosed, for example, in Japanese Patent (OPI) No. 91,546/1979.

It is preferred that in this invention, one or more of the following vinyl compounds be used: acrylic or methacrylic esters, such as, methyl acrylate, methyl methacrylate, ethyl acrylate, ethyl methacrylate, butyl acrylate, butyl methacrylate, 2-ethylhexyl acrylate, and 2-ethylhexyl methacrylate; carboxylic acids, such as, acrylic acid, methacrylic acid, itaconic acid, and fumaric acid; acid anhydride, such as, maleic acid anhydride; epoxy compounds, such as, glycidyl acrylate, and glycidyl methacrylate; amino compounds, such as, diethylaminoethyl acrylate, diethylaminoethyl methacrylate, and aminoethyl vinylether; acrylonitrile; iminol methacrylate; styrene; alpha methyl styrene; vinyl chloride; vinyl acetate; and vinyl propionate.

When these vinyl compounds are put to use in preparing a homopolymer or copolymer of vinyl resin, it is also possible to introduce carbon double bonds into end groups or side groups of the vinyl compounds by copolymerizing a suitable amount of allyl acrylate, allyl methacrylate or diallyl phthalate, with the vinyl compounds. The amount of these compounds needed to produce the double bonds in the vinyl compounds, can be arbitrarily determined according to the number of silyl radicals to be put into the vinyl compounds.

Besides, the molecular weight of the vinyl type resin can be adjusted by adding such chain transfer agents, as n-dodecylmercaptan and t-dodecylmercaptan or by finding a proper amount of polymerization initiators, and suitable polymerization temperature. Molecular weight may be measured, for example, by either the osmotic pressure method, or the GPC method.

In this invention, when the hydrosilanes are reacted with the carbon double bonds, contained in the vinyl compounds, one or more catalyst of transition elements is needed. Among such transition elements in Group VIII are platinum, rhodium cobalt, paladium, and nickel. Any of these elements may be effectively used for this purpose. The hydrosilylation is generally conducted at a temperature ranging from 50° to 150° C. for approximately 1 to 10 hrs.

Another process (Process B) utilizable in this invention for preparing vinyl type resin having silyl radicals, involves radical polymerization of silanes and vinyl compounds. The silanes are represented by the general formula:

$$\underset{R_2-Si-X_n}{\overset{(R_1)_{3-n}}{|}}$$

wherein $R_1$ represents a monovalent hydrocarbon radical selected from alkyl, aryl, and aralkyl radicals any of which have 1 to 10 carbon atoms; $R_2$ represents an organic radical having a double bond capable of polymerization, X represents a hydrolytic radical, and n is an integer from 1 to 3, inclusive.

The silanes practically used in this invention are, for example:

$$CH_2=CHSi(OCH_3)_2,\ \overset{CH_3}{\underset{|}{CH_2=CHSiCl_2}},$$

$$CH_2=CHSi(OCH_3)_3,\ CH_2=CHSiCl_3,$$

$$CH_2=CHCOO(CH_2)_3\overset{CH_3}{\underset{|}{Si}}(OCH_3)_2,$$

$$CH_2=CHCOO(CH_2)_2Si(OCH_3)_3,$$

$$CH_2=CHCOO(CH_2)_3\overset{CH_3}{\underset{|}{Si}}Cl_2,$$

$$CH_2=CHCOO(CH_2)_3SiCl_3$$

$$CH_2=C(CH_3)COO(CH_2)_3\overset{CH_3}{\underset{|}{Si}}(OCH_3)_2,$$

$$CH_2=C(CH_3)COO(CH_2)_3Si(OCH_3)_3,$$

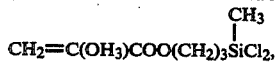

$CH_2=C(CH_3)COO(CH_2)_3SiCl_3,$

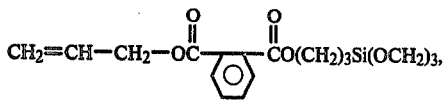

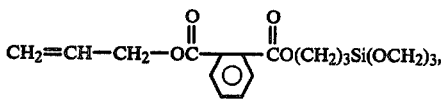

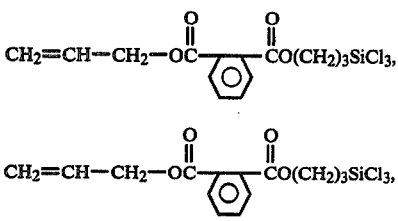

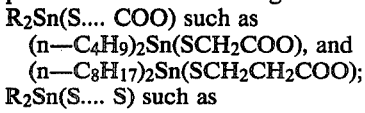

These silane compounds can be produced in various ways. For Example, the silane compounds may be produced by reacting acetylene, allylacrylate, allylmethacrylate, or diallylphthalate with methyldimethyoxysilane, methyldichlorosilane, trimethoxysilane, or trichlorosilane in the presence of a catalyst containing a transition element of Group VIII.

The vinyl compounds preferred for use in Process A are also preferred for use in this process B.

The production of copolymers from these vinyl compounds and silane compounds can be conducted according to any ordinary solution polymerization process. A reaction is carried out by heating a mixture of the vinyl compound, silane compound, and radical initiator to a temperature from 50° to 150° C. Other than these compounds, chain transfer agents like n-dodecylmercaptan and t-dodecylmercaptan are added to the reaction system in order to obtain vinyl type resin with a specified molecular weight, where desired.

Solvents may, but need not, be used. If, however, a solvent is used, ethers, hydrocarbons, acetic esters are preferable in this case because of their being non-reactive. For the vinyl type resin with silyl radical thus produced, it is possible to change one hydrolytic radical to the other, in accordance with a conventional process, such as shown, for example, in Japanese Pat. (OPI) No. 91546/1979.

In this way, there is obtained a vinyl type resin containing silyl radicals having a main chain substantially built up of a vinyl type polymer, and containing at least one silyl radical coupled with a hydrolytic radical at end groups or in side chains of each molecule, and the term "vinyl resin containing silyl radical" should be so understood.

The following novel hardening catalysts are used in this invention:

1. A mercaptide or sulfide type organic tin compound which has either Sn—S or Sn=S bond. Such compounds have the following structures:
   $R_2Sn(S.... COO)$ such as
   $(n-C_4H_9)_2Sn(SCH_2COO)$, and
   $(n-C_8H_{17})_2Sn(SCH_2CH_2COO)$;
   $R_2Sn(S.... S)$ such as
   $(n-C_8H_{17})_2Sn(SCH_2COOCH_2CH_2OCOCH_2S)$, and
   $(n-C_8H_{17})_2Sn(SCH_2COOCH_2CH_2CH_2OCOCH_2S)$;
   $R_2Sn(SCH_2COOR)_2$ such as
   $(n-C_4H_9)_2Sn(SCH_2COOC_8H_{17}\text{-iso})_2$, and
   $(n-C_4H_9)_2Sn(SCH_2COOC_{12}H_{25}\text{-n})_2$;
   $RSn(SCH_2COOR)_3$ such as
   $(n-C_4H_9)Sn(SCH_2COOC_8H_{17}\text{-iso})_3$; and
   $R_2Sn=S$ such as
   $(n-C_8H_{17})_2Sn=S$.

2. A mixture of the compounds listed above under paragraph 1, and the following carboxylic acid type organic tin compounds:
   $(n-C_4H_9)_2Sn(OCOC_{11}H_{23}-n)_2$,
   $(n-C_4H_9)_2Sn(OCOCH=CHCOOCH_2)_2$,
   $(n-C_8H_{17})_2Sn(OCOC_{11}H_{23}-n)_2$,
   $(n-C_8H_{17})_2Sn(OCOCH=CHCOOC_4H_9-n)_2$; and
   $Sn(OCOC_8H_{17}-n)_2$.

The mixing ratio of the carboxylic acid type organic tin compound to the mercaptide or sulfide type organic tin compound is preferably in the range of from 1: 0.1 to 1:20; and more preferably in the range of from 1:0.1 to 1:10, by weight.

3. A mixture of organic carboxylic acids or acid anhydrides and carboxylic acid type organic tin compounds. Among the carboxylic acids and acid anhydrides are: benzoic acid, phthalic acid, succinic acid, adipic acid, pyromellitic acid, formic acid, acetic acid, acetic acid anhydride, maleic acid anhydride, phthalic acid anhydride, succinic acid anhydride, pyromellitic acid dianhydride, and others. Almost all the carboxylic acid type organic tin compounds can be used similarly as in the case of above paragraph 2, but stannous compounds such as $Sn(OCOC_8H_{17-n})_2$, are not preferable because of the forming of precipitates. The mixing ratio of the carboxylic acid type organic tin compounds to the organic carboxylic acid or the acid anhydride is preferably in the range of from 1:0.1 to 1:20, and more preferably 1:0.1 to 1:10, by weight.

4. The organic carboxylic acids or acid anhydrides listed in paragraph 3 hereinabove, can be used by themselves.

The above disclosed novel hardening catalysts are usable with the many vinyl resins having silyl radicals disclosed herein, in a preferred amount of from 0.01 to 10 parts by weight of the hardening catalyst to 100 parts by weight of the vinyl resin. The hardening catalyst may be added to the vinyl resin having silyl groups, to form a homogeneous mixture.

As above stated, the present invention is able to provide a composition which retains an improved pot life under exposure to ambient atmosphere. The pot life of the composition, may be further improved when other components are added to such mixture of hardening catalyst and vinyl type resin. Examples of such other components are trialkylorthoformates, such as trimethylorthoformate, and triethylorthoformate; hydrolytic esters, such as, hydrolytic organic silicon compounds such as methyltriethoxysilane, methyltriacetoxysilane, vinyltrimethoxysilane, tetramethylorthosilicate, tetraethylorthosilicate, N-beta-(aminoethyl)-gamma-aminopropyltrimethoxysilane, methyltrimethoxysilane, methyltriethoxysilane, dimethyldimethoxysilane, dimethyldiethoxysilane, vinyl trimethoxysilane, vinyltriethoxysilane, gamma-methacryloxypropyltrimethoxysilane, beta-(3,4-epoxycyclohexyl)ethyltrimethoxysilane, gamma-glycidoxypropyltrimethoxysilane, gamma-mercaptopropyltrimethoxysilane, and gamma-aminopropyltriethoxysilane, and/or alkyl alcohols, such as methyl alcohol, butyl alcohol, amyl alcohol, and cellosolves. These are not essential to the invention.

Since the inventive composition containing a vinyl resin having silyl radicals, upon exposure to ambient or other moisture, hardens at ambient temperatures and below, it is useful for paints and coatings. The composition gives a glossy coat to surfaces on which it is coated or painted, after rapidly hardening at room temperature, as shown in the examples. Also, the hardness of the coating can be enhanced by adding to the composition a certain compound like ethylsilicate or silane coupling agent if it is capable of copolymerizing with the vinyl type resin having a silyl radical although not essential to the invention.

In addition, because the composition has a good affinity for a variety of conventional paints and coatings, it can be freely mixed with lacquers, acrylic coatings, etc. For example, it can be mixed into laquers, acrylic melamine paints, and epoxy paints, in appropriate proportions, and contributes to improvement of adhesion and weathering resistance of these paints and coatings.

On the other hand, many kinds of fillers and pigments, such as silica, calcium carbonate, magnesium carbonate, titanium oxide, iron oxide, fiberglass and others can be added to the composition although not essential to the invention.

Thus, the inventive composition is useful, for example, as paints and coatings, and sealants, such as for use on aircrafts, buildings, vehicles, and glass wares, or as surface treatment agents for many kinds of inorganic products, etc.

This invention will be further illustrated by actual examples, which examples are not to be construed in any limiting sense.

PREPARING VINYL TYPE RESIN WITH SILYL RADICALS

EXAMPLE 1

To 90 g of xylene heated to 90° C., were added dropwise 30 g of styrene, 16 g of allylmethacrylate, 20 g of methylmethacrylate, 19 g of n-butylmethacrylate, 14 g of butylacrylate, 4 g of maleic acid anhydride, and a solution of 2 g of azobisisobutylonitrile dissolved in 2 g of n-dodecylmercaptan, and a reaction was conducted for 10 hours.

As a result, a vinyl type polymer containing an allyl type unsaturated radical which had a molecular weight of 8,000 was obtained. The molecular weight was measured using the osmotic method or the GPC method, as convenient. Infrared spectroscopy showed that an absorption band attributable to carbon double bond and another absorption band attributable to acid anhydride radical were present at 1648 cm$^{-1}$ and 1780 cm$^{-1}$, respectively.

After that, 40 g of solvent was removed from the reaction product under reduced pressure. Into 16 g of the remaining solution were poured 1.5 g of trimethoxysilane and isopropanol solution containing 0.0005 g of chloroplatinic acid, and reaction was carried out at 90° C. for 6 hours in a closed vessel. Infrared spectroscopy showed that the absorption band at 1648 cm$^{-1}$ disappeared.

It was thus apparent that a vinyl type polymer having a silyl radical was obtained.

EXAMPLE 2

To 70 g of xylene heated to 90° C. were added dropwise 30 g of styrene, 22 g of gamma-methacryloxypropyltrimethoxysilane, 22 g of methylmethacrylate, 15 g of n-butylmethacrylate, and a solution of 2 g of azobisisobutylonitrile dissolved in 18 g of butylacrylate; and reaction was carried out for 10 hours.

As a result, a vinyl type resin with silyl radicals, which had a molecular weight of 16,000, was obtained.

EXAMPLE 3

Into 70 g of xylene heated to 90° C. were poured dropwise 30 g of styrene, 22 g of gamma methacryloxypropyltrimethoxysilane, 22 g of methyl methacrylate, 15 g of n-butyl methacrylate, 18 g of butyl acrylate, and a solution of 2 g of azobisisobutylonitrile dissolved in 2 g of n-dodecylmercaptan, and reaction was carried out for 10 hours.

As a result, a vinyl resin with silyl radicals, having a molecular weight of 9,000 was obtained.

EXAMPLE 4

Into 70 g of xylene heated to 90° C. were poured dropwise 30 g of styrene, 22 g of gamma- methacryloxypropyltrimethoxysilane, 22 g of methyl methacrylate, 15 g of n-butyl methacrylate, 18 g of butyl acrylate, 4 g of 2-hydroxyethyl methacrylate, and a solution of 2 g of azobisisobutylonitrile dissolved in 4 g of dodecylmercaptan, and reaction was carried out for 10 hours.

As a result, a vinyl type resin with silyl radicals, having a molecular weight of 6,000 was obtained.

Mixing Hardening Catalyst and Vinyl Type Resin with Silyl Group

A number of additives and hardening catalysts shown in Table 1, were put in each of the vinyl resin solutions prepared in Examples 1 through 4, and mixed together to form a homogeneous mixture. Next, these solution mixtures were diluted with xylene in order that each of the viscosity of these mixtures were adjusted to a certain value of 15 seconds, when measured by Ford cup test, as generally made in advance of painting.

After that, the pot life of these compositions was detected and determined by measuring the time it took until a layer of skim appeared on top of the composition or gelation occured, after exposure to ambient atmosphere. The results are given in Table 1.

From these results, it is clear that all of the inventive compositions have substantially improved pot life, without sacrificing any of the advantageous properties of the vinyl resins.

TABLE 1

| Example | Hardening catalyst | pt/100 pts resin | Additives | pts/100 pts resin | Pot life (hours) |
|---|---|---|---|---|---|
| 1 | Stann JF-9B | 3 | methanol OSE | 10 10 | >10 |
| 2 | Stann JF-9B | 3 | methanol | 10 | >10 |
| 3 | OT Stann JF-9B | 0.6 2.4 | OSE | 10 | >10 |

TABLE 1-continued

| Example | Hardening catalyst | pt/100 pts resin | Additives | pts/100 pts resin | Pot life (hours) |
|---|---|---|---|---|---|
| | OT | 1 | OSE | 10 | Skimming (3 hrs later) |
| | DTL | 3 | methanol | 10 | Skimming (3 hrs later) |
| | | | OSE | 10 | |
| 4 | DTL | 3 | methanol | 10 | >10 |
| | phthalic acid | 1 | OSE | 10 | |

Notes:
Stann JF-9B is a stabilizer for PVC produced by Sankyo Yuki, KK (components are (n-$C_4H_9)_2Sn(SCH_2COOR)_2$; R = $C_4$—$C_{12}$);
OT = tin octylate;
DTL = dibutyltin dilaurate;
OSE = tetraethylorthosilicate.

The foregoing description is illustrative of the principles of the invention. Numerous other modifications and extensions thereof would be apparent to the worker skilled in the art. All such modifications and extensions are to be considered to be within the spirit and scope of the invention.

What is claimed is:

1. A composition consisting essentially of a mixture of 0.01 to 10 parts by weight of a hardening catalyst and 100 parts by weight of a vinyl resin containing at least one silyl radical coupled with a hydrolytic radical at end groups or in side chains of each molecule, said silyl radical represented by the formula:

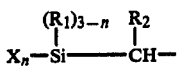

wherein X represents a hydrolytic radical, $R_1$ and $R_2$ represent hydrogen atom, alkyl, aryl, or aralkyl radicals, any of which has 1 to 10 carbon atoms, and n is an integer of 1,2 or 3, said hydrolytic radical being selected from the group consisting of halogen, alkoxy, acryloxy, ketoximato, amino, acid amide, aminoxy, mercapto, and alkenyloxy radicals; and wherein said viny resin containing silyl group is produced by copolymerization reaction of one or more vinyl compounds to produce a vinyl resin having a carbon double bond followed by hydrosilylation reaction with hydrosilane, or copolymerization of said one or more vinyl compounds with silane compound having a double bond capable of polymerization, wherein said one or more vinyl compounds is selected from the group consisting of acrylic or methacrylic esters, carboxylic acids, acid anhydrides, epoxy compounds, amino compounds, acrylonitrile, iminolmethacrylate styrene, alpha methyl styrene, vinyl chloride, vinyl acetate, and vinyl propionate; and wherein said hardening catalyst comprises a mercaptide organic tin compound having Sn—S bond, or a sulfide organic tin compound having Sn=S bond, selected from the group consisting of (n—$C_4H_9)_2Sn(SCH_2COO$)

(n—$C_8H_{17})_2Sn(SCH_2CH_2COO$)

(n—$C_8H_{17})_2Sn(SCH_2COOCH_2CH_2OCOCH_2S$)

(n—$C_8H_{17})_2Sn(SCH_2COOCH_2CH_2CH_2OCOCH_2S$)

(n—$C_4H_9)_2Sn(SCH_2COOC_8H_{17\text{-}iso})_2$ (n—$C_4H_9)_2Sn(SCH_2COOC_{12}H_{25\text{-}n})_2$ (n—$C_4H_9)_2Sn(SCH_2COOC_8H_{17\text{-}iso})_3$, and (n—$C_8H_{17})_2Sn$=S;

wherein said carboxylic acid is selected from the group consisting of acrylic acid, methacrylic acid, itaconic acid, and fumeric acid; wherein said acid anhydride is maleic acid anhydride; wherein said epoxy compound is selected from the group consisting of glycidyl acrylate and glycidyl methacrylate; and wherein said amino compound is selected from the group consisting of diethylamino ethyl acrylate, diethylaminoethyl methacrylate, and amino ethyl vinylether; and wherein said acrylic or methacrylic ester is selected from the group consisting of methyl acrylate, methyl methacrylate, ethyl acrylate, ethyl methacrylate, butyl acrylate, butyl methacrylate, 2-ethylhexyl acrylate, and 2-ethylhexyl methacrylate;

whereby pot life of said mixture is substantially lengthened.

2. The composition of claim 1, wherein said hardening catalyst is a mixture of a carboxylic acid organic tin compound and said mercaptide tin compound or said sulfide tin compound, in a ratio by weight of between 1:0.1 to 1:20; wherein said carboxylic acid organic tin compound is selected from the group consisting of (n—$C_4H_9)_2Sn(OCOC_{11}H_{23}$—n$)_2$ (n—$C_4H_9)_2Sn(OCOCH$=$CHCOOCH_2)_2$ (n—$C_8H_{17})_2Sn(OCOC_{11}H_{23\text{-}n})_2$ (n—$C_8H_{17})_2Sn(OCOCH$=$CHCOOC_4H_{9\text{-}n})_2$ and $Sn(OCOC_8H_{17\text{-}n})_2$.

3. A composition consisting essentially of a mixture of 0.01 parts by weight of a hardening catalyst and 100 parts by weight of a vinyl resin containing at least one silyl radical coupled with a hydrolytic radical at end groups or in side chains or each molecule, said silyl radical represented by the formula:

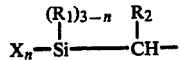

wherein X represents a hydrolytic radical, $R_1$ and $R_2$ represent hydrogen atom, and alkyl, aryl and aralkyl radicals, any of which has 1 to 10 carbon atoms, and n is an integer of 1,2 or 3, said hydrolytic radical being selected from the group consisting of halogen, alkoxy, acyloxy, ketoximato, amino, acid amide, aminoxy, mercapto and alkenyloxy radicals; and wherein said vinyl resin containing silyl group is produced by copolymerization reaction of one or more vinyl compounds to produce a vinyl resin having a carbon double bond followed by hydrosilylation reaction with hydrosilane, or copolymerization of said one or more vinyl compounds with silane compound having a double bond capable of polymerization, wherein said one or more vinyl compounds is selected from the group consisting of acrylic or methacrylic esters, carboxylic acids, acid anhydrides, epoxy compounds, amino compounds, acrylonitrile, iminolmethacrylate, styrene, alpha methylstyrene, vinyl chloride, vinyl acetate and vinyl propionate;

wherein said carboxylic acid is selected from the group consisting of acrylic acid, methacrylic acid, itaconic acid, and fumeric acid; wherein said acid anhydride is maleic acid anhydride; wherein said epoxy compound is selected from the group consisting of glycidyl acrylate and glycidyl methacrylate; and wherein said amino compound is selected from the group consisting of diethylaminoethyl acrylate, diethylaminoethyl methacrylate, and amino ethyl vinylether; and wherein said acrylic or methacrylic ester is selected from the group consisting of methyl acrylate, methyl methacrylate, ethyl acrylate, ethyl methacrylate, butyl acrylate, butyl methacrylate, 2-ethylhexyl acrylate, and 2-ethylhexyl methacrylate; and wherein said hardening catalyst comprises carboxylic acids or acid anhydrides selected from the group consisting of benzoic acid, phthalic acid, succinic acid, adipic acid, pyromellitic acid, formic acid, acetic acid, acetic acid anhydride, maleic acid anhydride, phthalic acid anhydride, succinic acid anhydride and pyromellitic acid anhydride.

4. The composition of claim 3, wherein said hardening catalyst is a mixture of carboxylic acid organic tin compound and said organic carboxylic acid or acid anhydride, in a weight ratio of between 1:0.1 to 1:20; wherein said carboxylic tin compound is selected from the group consisting of (n—$C_4H_9$)$_2$Sn(OCOC$_{11}$H$_{23-n}$)$_2$ (n—$C_4H_9$)$_2$Sn(OCOCH=CHCOOCH$_2$)$_2$ (n—$C_4H_{17}$)$_2$Sn(OCOC$_{11}$H$_{23-n}$)$_2$ (n—$C_8H_{17}$)$_2$Sn(OCOCH=CHCOOC$_4$H$_{9-n}$)$_2$ and Sn(OCOC$_8$H$_{17-n}$)$_2$.

5. The composition of claim 2 or claim 4, wherein said weight ratio is between 1:0.1 to 1:10.

6. The composition of claim 1 or 3, wherein said vinyl compound is selected from the group consisting of styrene, methyl methacrylate, n-butyl methacrylate, butyl acrylate and maleic anhydride; and said hardening catalyst comprises (n—$C_4H_9$)$_2$Sn(SCH$_2$COOR)$_2$ wherein R=$C_4$-$C_{12}$ or a mixture of dibtuyl tin dilaurate and phthalic acid.

* * * * *